United States Patent [19]

Leeming

[11] 4,196,699

[45] Apr. 8, 1980

[54] POULTRY DRINKER

[76] Inventor: David C. Leeming, 22a Bereweeke Ave., Winchester, Hampshire, England

[21] Appl. No.: 871,167

[22] Filed: Jan. 20, 1978

[30] Foreign Application Priority Data

Jan. 13, 1978 [GB] United Kingdom ............... 1499/78

[51] Int. Cl.$^2$ .............................................. A01K 7/00
[52] U.S. Cl. ..................................................... 119/81
[58] Field of Search ........................................ 119/81

[56] References Cited

U.S. PATENT DOCUMENTS

| 3,283,746 | 11/1966 | Rüter | 119/81 |
| 3,685,495 | 8/1972 | Kantor | 119/81 |

Primary Examiner—Louis G. Mancene
Assistant Examiner—Daniel J. Leach
Attorney, Agent, or Firm—Sughrue, Rothwell, Mion, Zinn and Macpeak

[57] ABSTRACT

A poultry drinker for suspension or for standing on the ground comprises a trough member, a suspendible hanging member from which the trough member is suspended, a resilient connection between the trough member and the hanging member, a valve controlling water supply to the trough in dependence on the amount of water in the trough, and a stand member which can be used to support the stand on the ground, the stand member having a base projecting below the trough member and support means at its upper end for supporting the hanging member when the drinking trough is standing on the ground, the stand member being coupled to the trough member by a coupling which permits limited relative vertical movement so that when the drinking trough is suspended from above, the stand member is suspended from the trough member but when standing on the ground, the trough member may move relative to the stand member in order to operate the valve.

9 Claims, 1 Drawing Figure

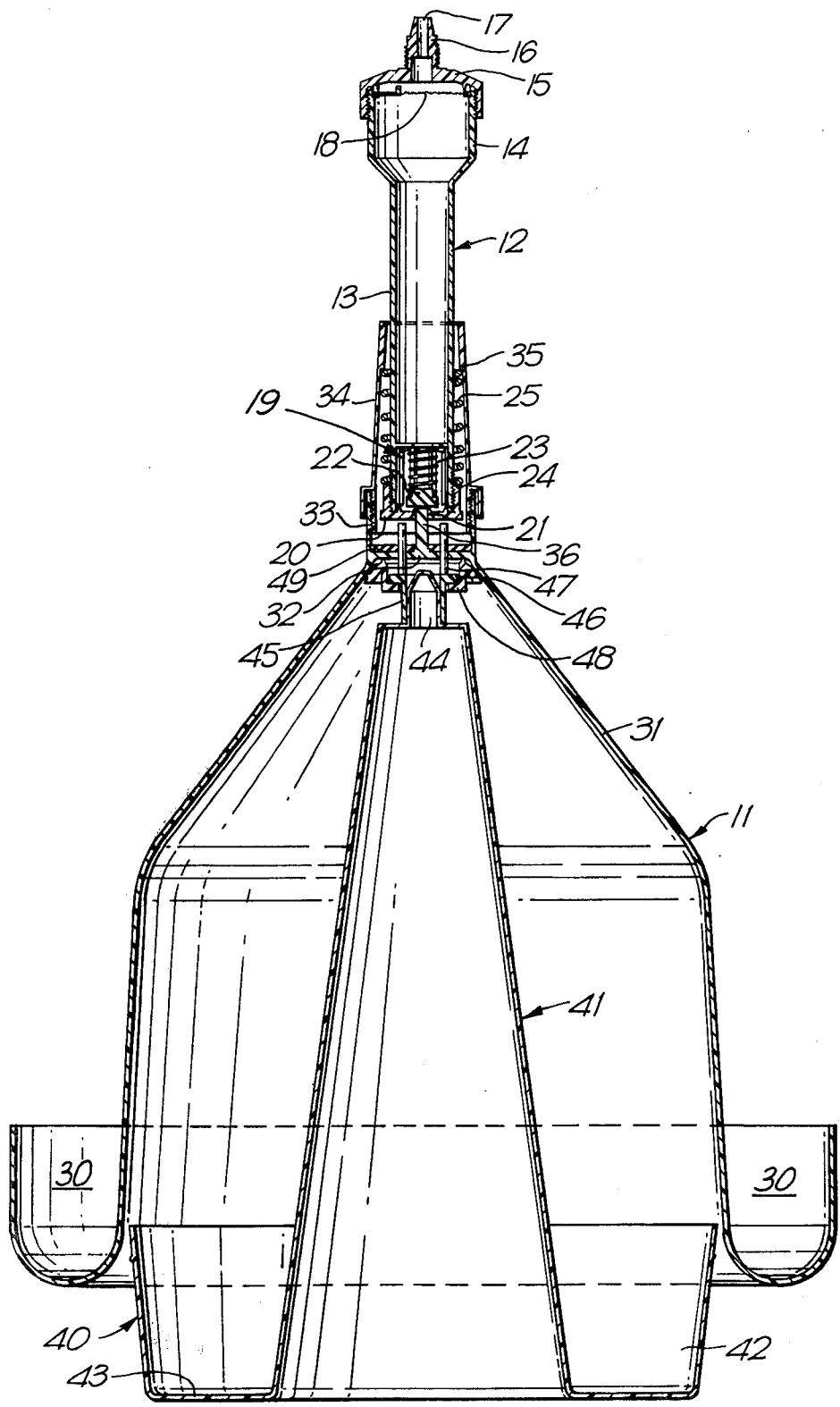

POULTRY DRINKER

BACKGROUND OF THE INVENTION

The present invention relates to poultry drinking troughs and particularly to such troughs which may be used when suspended or when standing on the ground.

Poultry drinking troughs of the suspension type are well known. Such devices may include a trough member resiliently mounted from a hanging member, the resilient mounting being used to control a valve for automatically controlling water supply to the trough. Such troughs rely on movement of the trough member relative to the hanging member in dependence on the weight of water in the trough in order to control the water supply and consequently they are not normally suitable for operation when standing on the ground. Although suspended troughs have proved very satisfactory for most poultry, problems can sometimes arise with very small chicks as the trough then needs to be located very close to the ground. In some such cases it can be desirable to provide a unit in which the water supply valve continues to operate satisfactorily even if the unit on the ground.

It is an object of the present invention to provide an improved poultry drinking trough incorporating valve means for controlling flow of water through a supply passage, which unit may be operated satisfactorily when suspended or when standing on the ground.

SUMMARY OF THE INVENTION

The present invention provides a poultry drinking trough for suspension or standing on the ground, which drinking trough comprises a trough member for holding poultry drinking water, a suspendible hanging member from which the trough member is suspended, resilient means connecting the trough member to the hanging member, a water supply passage, valve means for controlling the flow of water to the trough member from the supply passage and arranged to be operated in dependence on movement of the trough member relative to the hanging member, and a stand member which may be used when desired to support the poultry drinking trough in position standing on the ground, said stand member having a base which projects below the trough member so as to be capable of resting on the ground when necessary and support means at its upper end for supporting the hanging member when the drinking trough is standing on the ground, said stand member having a coupling to the trough member which permits limited relative vertical movement between the trough member and the stand member whereby when the drinking trough is suspended from above, the stand member is suspended from the trough member but when standing on the ground, the trough member may move relative to the stand member in order to operate the valve means.

It will be appreciated that when the poultry drinking trough is suspended from above, both the trough member and the stand member are connected through the resilient means to the hanging member. On the other hand, when standing on the ground, the hanging member is supported on the stand member so that only the trough member is supported through the resilient means. This does result in the load supported through the resilient means varying in dependence on whether the drinking trough is suspended from above or standing on the ground. By arranging for the valve means to be actuated in dependence on the load supported through the resilient means, the loss in weight of the stand member when the unit is standing on the ground merely results in additional water being fed to the trough member as the water in the trough member forms part of the load supported through the resilient means. As the drinking trough is normally used on the ground when providing water for young chicks, this is advantageous in that it results in a higher water level in the trough and thereby makes the water more accessible to the chicks.

Preferably the trough member comprises a hollow member of generally inverted funnel shape and said stand member is located within the hollow interior of the trough member and projects below it. Preferably it projects only slightly so that when standing on the ground the trough member is located very close to the ground.

Preferably the stand member is provided with a water containing means so that the stand member may be weighted with ballast water when desired. In this way, the stand member may be used to reduce swinging of the poultry drinking trough when it is suspended from above.

Preferably the stand member comprises a further water containing trough with a generally flat base.

Preferably the stand member and the trough member, are connected by a coupling comprising two engaging members freely slidable relative to each other and upper and lower stop members limiting the extent of sliding movement.

Preferably the stand member is provided with upwardly projecting abutment means which provides a seating for supporting the hanging member when the poultry drinking trough stands on the ground.

Preferably the valve means is located in the hanging member and a valve actuating member is carried by the trough member so as to operate the valve in dependence on movement of the trough member relative to the hanging member.

Preferably the resilient means connecting the trough member to the hanging member is biased so that the valve actuating member tends to open the valve means, the bias of the resilient means being opposed by the weight of the trough member an any water contained in it.

Preferably the stand member is provided with a plurality of upwardly projecting abutment means for supporting the hanging member, said abutment means being arranged around the valve actuating member.

BRIEF DESCRIPTION OF THE DRAWING

The accompanying drawing shows a cross-section through a poultry drinking trough in accordance with the present invention.

DESCRIPTION OF THE PREFERRED EMBODIMENT

The poultry drinking trough shown in the drawing includes a trough member 11 supported from hanging member 12. The hanging member consists of a cylindrical body 13 having an enlarged upper end 14 which screw-threadedly engages a cap 15. The cap 15 is provided with a upwardly extending nozzle 16 and contains a water supply passage 17. The nozzle 16 is externally screw-threaded for coupling to an overhead suspension system including a flexible water supply pipe. A filter 18 is incorporated in the upper part of the hanging member 12. At its lower end, the hanging member 12 incorporates a valve device 19 for controlling the supply of water to the trough member. The lower end of the body 13 has an end wall 20 with a water outlet passage 21. The valve has a valve closure member 22 normally urged by a compression spring 23 to a position closing the outlet passage 21. The end wall 20 is provided on a cap member which screw-threadedly engages the lower end of the body 13 and this provides an external shoulder 24 against which the lower end of a compression spring 25 abuts. The spring 25 externally surrounds the body 13 of the hanging member 12.

The trough member 11 comprises a hollow annular member of generally inverted funnel shape. The lower end of the trough member is upturned to form an annular channel 30 surrounding the lower end of the trough member. The upper end of the trough member has a generally conical wall 31 leading to an upper end wall 32. An upwardly projecting sleeve 33, formed integrally with the trough member 11, projects upwardly from the end wall 32. The screw thread in the sleeve member 33 is engaged by the lower end of a tubular casing 34 which surrounds the lower end of the hanging member 12 and encases the compression spring 25. The upper end of the spring 25 engages a shoulder 35 in the upper end of the casing 34. By adjusting the screw threaded connection between the casing 34 and the sleeve 33, the degree of compression in the spring 25 can be adjusted. The end wall 32 of the trough member 11 is provided with an upstanding valve actuating member in the form of a central rod 36. The rod 36 projects upwardly into the outlet 21 at the lower end of the hanging member 12. The upper end of the rod 36 is arranged to engage the valve closure member 22 and to move the valve to an open position when the compression spring 25 urges the trough member 11, and thereby the valve actuating rod 36, upwardly relative to the hanging member 12. When the valve is in the open position water is allowed to pass from the supply passage 12 through the tubular body 13 and out through the outlet passage 21 into the chamber within the sleeve 33. The sleeve is provided with a plurality of apertures (not shown) which permit the water to flow outwardly onto the external surface of the conical wall 31 of the trough member 11. The water can then run down the trough member into the annular channel 30 from which the poultry may drink.

In order to allow the unit to stand on the ground, a stand member 40 is provided. The stand member 40 comprises a hollow conical body 41 located within the trough member 11. The body 41 is surrounded at its lower end by an annular channel 42 having a generally flat base 43. The base 43 projects a short distance below the bottom of the channel 30 of the trough member 11. At its upper end, the body 41 of the stand member is provided with an upstanding boss 44 which is a tight fit into a surrounding sleeve 45. The sleeve has a annular flange 46 and three upstanding pins 47. Each of the pins 47 passes through an aperture in the upper end wall 32 of the trough member 11. Each of the pins 47 terminates in a common plane so as to provide abutment means for supporting the lower end wall of the hanging member 12 when the poultry drinking trough stands on the ground. The sleeve 45 is freely slidable within a central aperture in a cup member 48 which is welded to the interior of the top end of the conical part 31 of the trough member 11. The cup member is of such depth as to allow limited vertical movement between the stand member 40 and the trough member 11. The extent of movement is limited by the spacing between the wall 32 at the top of the trough member 11 and the lower wall of the cup member 48 as these two walls act as limiting stops on vertical movement of the flange 46 which moves with the stand member 40.

In the above described example, all parts referred to are made of moulded plastics material apart from the springs involved. A rubber or neoprene sealing ring 49 is however included immediately above the wall 32 at the upper end of the trough member 11. This sealing ring 49 is provided with a central aperture through which the valve actuating rod 36 passes together with three other apertures through each of which passes a respective one of the pins 47. The sealing ring prevents water passing down into the interior part of the trough member 11.

In operation of the device, a water supply tube, which may also act as an overhead suspension member is coupled to the nozzle 16 at the upper end of the poultry drinking trough and the unit is normally suspended above the ground. In this way, the trough member 11 and the stand member 40 hang in suspension from the hanging member 12 through the resilient mounting provided by the compression spring 25. When the trough is empty the spring 25 is strong enough to raise the trough member 11 and stand 40 so that the valve actuating member 36 opens the valve to permit water to flow from the supply passage 17 through the body 13 and down the exterior of the trough member 11 into the channel 30 from which the poultry may drink. When the combined weight of the trough member 11, stand 40 and water in the trough is sufficient to overcome the bias of the spring 25, the trough member 11 moves downwardly against the action of the spring 25 until the valve actuating member 36 allows the water supply valve to close. As poultry drink water from the trough, the weight in the trough decreases and consequently the valve is allowed to open once again. In this way, the water content in the channel 30 is automatically replenished and kept at a substantially constant level. The water level is dependent on the degree of compression of the spring 25 and this can be adjusted by rotating the casing 34 relative to the sleeve 33, thereby altering the desired water level.

When in use for very small chicks, the whole unit may be lowered towards the ground until the base 43 of the stand member 40 engages the ground. This has the effect of stabilizing the position of the trough as it prevents swinging and furthermore it locates the lower end of the trough member 11 as near the ground as possible to facilitate access to the water in the trough. When the stand member 40 rests on the ground, the hanging member 12 is no longer acting as an overhead suspension system and it rests on the top of the pins 47 which are now supported on the ground through the stand member 40. The trough member 11 can drip slightly relative to the stand member 40 due to movement of the flange 46 within the cup member 48. This allows the trough member 11 to be supported again through the resilient connection of the spring 25. The action of the water supply valve is then the same as previously described. If the weight of the trough and any water in it is sufficient to overcome the action of the spring 25, the trough member 11 drops sufficiently to cause the valve to close. When there is insufficient water in the trough the trough member 11 will rise under the action of the spring 25 thereby opening the valve and allowing further water to enter the trough. In this condition, the weight of the stand member 40 is not acting against the spring 25 and consequently more water will be admitted to the trough member before reaching the shut-off point for the water supply valve. However, this is beneficial in allowing the water level in the trough 30 to take up a higher level thereby making access easier for small chicks.

The stand member 40 is provided with the channel 42 at its lower end so that this may be used to contain water when desired thereby acting as ballast. When the unit is suspended from above the effect of the ballast is to reduce the tendency of the drinking trough to swing when in use. When ballast water is contained in the channel 42 it is of course necessary to adjust the compression of the spring 25 to achieve the required water level in the trough 30.

The invention is not limited to the details of the foregoing example.

I claim:

1. A poultry drinking trough for suspension or standing on the ground which drinking trough comprises a trough member for holding poultry drinking water, a suspendible hanging member from which the trough member is suspended, resilient means connecting the trough member to the hanging member, a water supply passage, valve means for controlling the flow of water to the trough member from the supply passage and arranged to be operated in dependence on movement of the trough member relative to the hanging member, and a stand member which may be used when desired to support the poultry drinking trough in position standing on the ground, said stand member having a base which projects below the trough member so as to be capable of resting on the ground when necessary and support means at its upper end for supporting the hanging member when the drinking trough is standing on the ground, said stand member having a coupling to the trough member which permits limited relative vertical movement between the trough member and the stand member whereby when the drinking trough is suspended from above, the stand member is suspended from the trough member but when standing on the ground, the trough member may move relative to the stand member in order to operate the valve means.

2. A drinking trough according to claim 1, in which the trough member comprises a hollow member of generally inverted funnel shape and said stand member is located within the hollow interior of the trough member and projects below it.

3. A drinking trough according to claim 1 in which the stand member is provided with a water containing means so that the stand member may be weighted with ballast water when desired.

4. A drinking trough according to claim 3 in which the stand member comprises a further water containing trough with a generally flat base.

5. A drinking trough according to claim 1 in which the stand member and the trough member are connected by a coupling comprising two engaging members which are slidable relative to each other and upper and lower stop members limiting the extent of sliding movement.

6. A drinking trough according to claim 1 in which the stand member is provided with upwardly projecting abutment means which provides a seating for supporting the hanging member when the poultry drinking trough stands on the ground.

7. A poultry drinking trough according to claim 1 in which the valve means is located in the hanging member and a valve actuating member is carried by the trough member so as to operate the valve in dependence on movement of the trough member relative to the hanging member.

8. A poultry drinking trough according to claim 7 in which the resilient means connecting the trough member to the hanging member is biased so that the valve actuating member tends to open the valve means, the bias of the resilient means being opposed by the weight of the trough member and any water contained in it.

9. A poultry drinking trough according to claim 8 in which the stand member is provided with a plurality of upwardly projecting abutment means for supporting the hanging member, said abutment means being arranged around the valve actuating member.

* * * * *